July 4, 1933.  J. J. REINHOLD  1,916,529
OPTICAL ADVERTISING DEVICE
Filed July 10, 1931
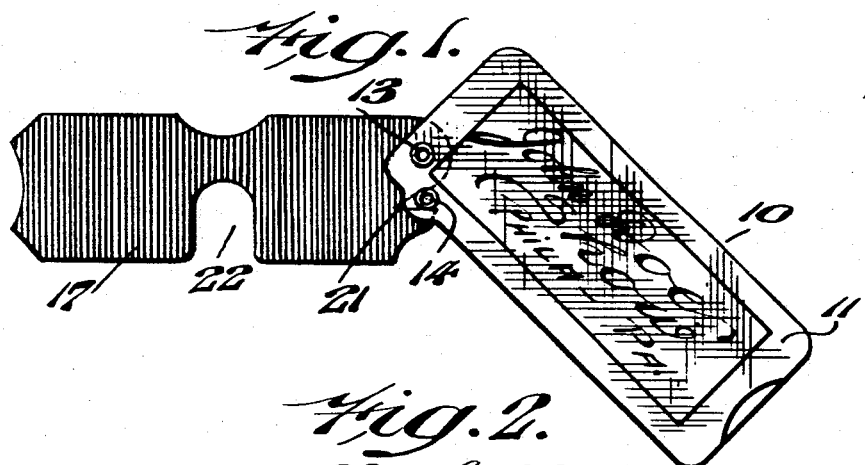
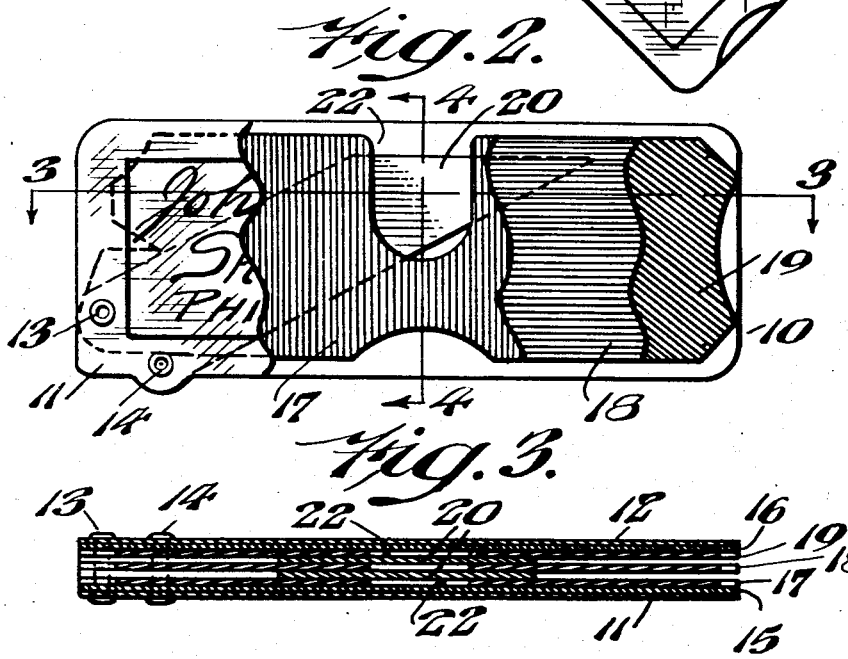
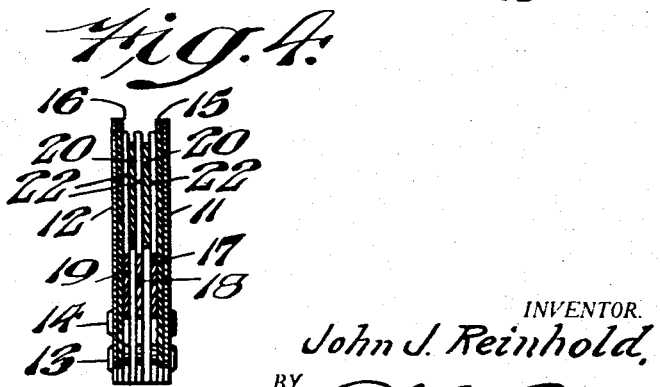
INVENTOR.
John J. Reinhold,
BY
ATTORNEY.

Patented July 4, 1933

1,916,529

UNITED STATES PATENT OFFICE

JOHN J. REINHOLD, OF MARIETTA, PENNSYLVANIA

OPTICAL ADVERTISING DEVICE

Application filed July 10, 1931. Serial No. 549,917.

The present invention relates generally to optical devices and more particularly to a combination of transparent color screens for obtaining a variety of visual effects.

Some of the objects of the present invention are to provide a novel and entertaining device for viewing surrounding objects, scenery, cloud effects, sunsets, or anything which it is desired to see under a light effect different from a natural one; to provide a simple, compact color screen device which can be carried in the pocket for ready use whenever desired; to provide a case of convenient size having mounted therein a plurality of transparent leaves, members or screens each of a color different from the others and each capable of being pulled out of the case for independent use; to provide an efficient assembly of color screens in a case wherein each screen can be withdrawn and replaced without interfering with the adjacent screens or becoming entangled therewith; to provide a color screen assembly wherein a plurality of spacers are rigidly fastened within a case for respectively separating a plurality of pivoted color screens and allowing such screens to be swung from operative to inoperative position without interference; and to provide other improvements as will hereinafter appear.

In the accompanying drawing Fig. 1 represents a front elevation of the device of the present invention with one screen shown in operable position; Fig. 2 represents a front elevation of the device with parts broken away to show the general inside arrangement; Fig. 3 represents a section on line 3—3 of Fig. 2; and Fig. 4 represents a section on line 4—4 of Fig. 2.

Referring to the drawing one form of the present invention consists of a case 10 formed, as here shown, of a front protective cover 11 and a rear protective cover 12 which are interconnected by two eyelets 13 and 14 arranged in proper relative positions to carry out a function later to be described. Both covers 11 and 12 are preferably of transparent material so that an advertisement on the inner side of each can be easily read from the outer side thereof. Thus a sheet 15 of suitable material having an advertisement thereon is attached in face to face relation to the inner face of the cover 11 so that the reading matter thereon is not only clearly visible through the cover 11 but is also completely protected against soiling or wearing off. In a like manner a sheet 16 carrying an advertisement is attached to the cover 12. The two cover parts 11 and 12 are of a convenient size to be grasped in the hand of the user and are spaced apart to accommodate a plurality of transparent color screens 17, 18 and 19 plus a plurality of spacer elements 20. These screens are of different color so that one effect is obtained by looking through one screen, a different effect when looking through another and so forth depending upon the number of color screens mounted for use. As shown by way of example there are three screens, the one 17 being red, the one 18 being blue, and the one 19 being green. The number of screens and the selection of colors is arbitrary as will be understood and the invention is not limited to the construction illustrated.

All of the screens are pivoted upon the eyelet 13 as a common axis and the location of this is such as to allow substantially the full area of the screens to be swung out of the covers 11 and 12 for use before the eyes of the user. The relative position of one of the exposed screens to the handle covers is seen in Fig. 1 and from which it will be observed that the eyelet 14 serves as a stop to limit the swing of the screens. A notch 21 is cut in the side edge of each screen and so located as to form a seat into which the eyelet is received when the screen is swung to its full open position. When the screens are within the covers the lower edge of each rests upon the eyelet 14 and consequently all the screens are located side by side and concealed by the covers. Thus the eyelet 14 serves as a stop for both limits of swing of the screens and is a simple and effective construction for the purpose intended.

Since the device is often used in moving vehicles it is desirable to provide means for preventing the screens from vibrating when held before the eyes, such means in the present instance, consisting of a cut-out 22 at substantially the middle part of one edge of each screen and designed to receive and allow the screen to fit over the bridge of the nose. In this operative position and held firmly by the handle the screen is steady and allows viewing without straining and tiring the eyes.

The spacers 20 are fixed in position by both of the eyelets 13 and 14 and extend respectively between pairs of the screens to cross the cut-outs 22 when the screens are within the covers. This construction assures each screen being able to swing in its plane of movement without catching upon or being interfered with in any way by the adjacent screens. Thus the spacers 20 guide and maintain the screens in proper assembled relation while permitting any one selected to be swung outward to its viewing position and returned to protected position with the cover parts. The selection of a screen can be facilitated by making each slightly shorter than the one next adjacent as this allows the thumb of the user to be inserted quickly between any two screens to separate them and grasp the one desired.

The device may be carried in the pocket or in an automobile or any other vehicle for use when desired, which use consists of selecting one of the screens and turning it about the axis eyelet 13 until the notch 21 rides about the eyelet 14 as a stop. The position of the parts is now as shown in Fig. 1, and the screen can then be positioned on the nose in front of the eyes so that the natural appearance of the object, scene or whatever it happens to be is transformed according to the color of the screen. Thus a very beautiful landscape or sunset can be viewed through a red screen, a green screen, a blue screen or any other color and the effects noted, compared, admired, and so forth. Until the device is actually used it is hard to realize the transformations which are possible as well as the many pleasing effects which can be obtained.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. An optical device comprising a cover member forming a handle, a plurality of transparent color screens pivoted to said member to swing parallel thereto from a position concealed by said cover to an exposed position for use in front of both eyes of the user, and means to limit the relative movement of each screen with respect to said handle.

2. An optical device comprising a pair of cover members together forming a handle, spacer elements between said members, two eyelets connecting said cover members and spacer elements together, and a plurality of transparent colored screens pivoted upon one of said eyelets and respectively spaced by said spacer elements, each of said screens being of a size to permit simultaneous viewing therethrough by both eyes of the user, the second eyelet being in the path of movement of all of said screens to form a stop.

3. An optical device comprising a pair of cover members together forming a handle, spacer elements between said members, two fastening devices connecting said cover members and spacer elements together, and a plurality of transparent colored screens pivoted upon one of said devices and the second fastening device being in the path of movement of all of said screens to limit the movement of said screens in both directions each of said screens being of a size to permit simultaneous viewing therethrough by both eyes of the user.

4. An optical device comprising a pair of cover members together forming a handle, spacer elements between said members, two fastening devices connecting said cover members and spacer elements together, and a plurality of transparent colored screens pivoted upon one of said devices and respectively spaced by said spacer elements, each of said screens being of a size to permit simultaneous viewing therethrough by both eyes of the user and having a notch to engage the other of said fastening devices to limit the movement of the screens in one direction.

5. An optical device comprising a pair of cover members together forming a handle, spacer elements between said members, two eyelets connecting said cover members and spacer elements together, and a plurality of transparent colored screens pivoted upon one of said eyelets and respectively spaced by said spacer elements, each of said screens being of a size to permit simultaneous viewing therethrough by both eyes of the user, the second eyelet being in the path of movement of all of said screens to form a stop, and each of said screens having a cut-out to seat on the nose of the user.

6. An optical device comprising a pair of transparent cover members, spacer elements between said members, sheets for display material respectively attached to the inner faces of said members, two eyelets connecting said cover members and spacer elements together, and a plurality of transparent colored screens pivoted upon one of said eyelets and respectively spaced by said spacer elements, the second eyelet being in the path of movement of all of said screens to form a stop.

Signed at Philadelphia, county of Philadelphia, State of Pennsylvania, this 8th day of July, 1931.

JOHN J. REINHOLD.